United States Patent [19]

Wilson

[11] 4,248,708

[45] Feb. 3, 1981

[54] PURIFICATION OF FLOTATION TAILINGS WATER

[75] Inventor: Martin Wilson, Irvine, Calif.

[73] Assignee: United States Borax & Chemical Corporation, Los Angeles, Calif.

[21] Appl. No.: 69,415

[22] Filed: Aug. 24, 1979

[51] Int. Cl.$^3$ ............................................. C02F 1/56
[52] U.S. Cl. ..................................... 210/727; 210/728
[58] Field of Search .................... 210/53, 54, 51, 52

[56] References Cited

U.S. PATENT DOCUMENTS

| | | | |
|---|---|---|---|
| 3,020,231 | 2/1962 | Colwell et al. | 210/54 |
| 3,278,277 | 10/1966 | Goren | 210/54 X |
| 3,498,912 | 3/1970 | Kieper et al. | 210/54 X |
| 3,681,283 | 8/1972 | Yueh | 210/54 X |

*Primary Examiner*—Thomas G. Wyse
*Attorney, Agent, or Firm*—James R. Thornton

[57] ABSTRACT

Tailings slurry from fluorspar flotation is clarified and purified by sequential addition of a cationic polygalactomannan derivative and a poly(ethylene oxide).

10 Claims, No Drawings

PURIFICATION OF FLOTATION TAILINGS WATER

This invention relates to the clarification and purification of water from fluorspar flotation processes.

BACKGROUND OF THE INVENTION

Acid grade fluorspar (calcium fluoride) is generally obtained by means of a froth flotation procedure in which the fluorspar ore is ground and slurried with water, treated with flotation reagents and then submitted to a froth flotation procedure. The floated concentrate containing the calcium fluoride is recovered and may be submitted to further cleaner flotation steps. The tailings from the flotation procedure consist of silicates and carbonates which may be discarded or processed further for recovery of desirable products. A large volume of water is required in the process and, in the past, most fluorspar flotation operations did not recycle the water.

Fluorspar flotation is very sensitive to water quality since soluble salts may interfere with the flotation and reduce the grade and recovery of the product. Accordingly, only fresh and in many cases softened water is used in most fluorspar flotation operations. However, with increased concern for environmental contamination, it is desirable to recycle a large portion or possibly all of the process water used in such operations. In order to recycle the water, the tailings from the flotation procedure must be treated and clarified to minimize the build-up of slimes and interfering soluble compounds.

Various flocculating agents or coagulants such as aluminum sulfate and ferric chloride have been proposed for settling slimes in the tailings water from fluorspar flotation operations. However, since soluble salts build up in such water, they are usually unsuitable, either for recycle or discharge into the environment. Various organic polymers have been proposed as coagulants or flocculants for use in mineral processing and waste water treatment. For example, the use of polyacrylamides, polysaccharides, and flocculating glues is proposed in U.S. Pat. No. 3,138,550. High molecular weight ethylene oxide polymers were proposed by Manley, U.S. Pat. No. 3,141,816 as flocculants for removing fibers and other solid materials from waste water from paper making processes. Technical Service bulletins for POLYOX ethylene oxide polymers and JAGUAR C-13, a cationic guar derivative, recommend their use as flocculants in mineral processing.

SUMMARY OF THE INVENTION

There is provided by this invention an improved process for treating water obtained from a fluorspar flotation procedure in order to substantially reduce slimes and interfering soluble materials so that the water may be recycled in the process and further to improve the overall quality of the water so that, if necessary, some or most may be discarded without adverse effect on the environment.

The present invention provides a process utilizing a specific combination of coagulants or flocculants in order to obtain a significant improvement in tailings waters from a fluorspar flotation operation. By use of the combination of reagents of the present invention, one can obtain clear water which can be recycled in the flotation process with no adverse effect on the fluorspar metallurgy. Recovery and grade of fluorspar in subsequent flotation procedures, using an excess of 90% of the treated process water in recycle, is not significantly affected.

DESCRIPTION OF THE INVENTION

The present process employs a cationic polygalactomannan derivative as the primary flocculant and a high molecular weight poly(ethylene oxide) as a secondary flocculant. Polygalactomannans are polysaccharides composed principally of galactose and mannose units and are usually found in the endosperm of leguminous seeds such as guar, locust bean, honey locust, flame tree, and the like. The polygalactomannan derivatives employed in the present invention are cationic; that is, they have cationic substituent groups on the molecule. Such cationic groups may be formed by reaction of the polygalactomannan with a haloalkyl-substituted quaternary ammonium compound under alkaline conditions such as described by DeMartino in U.S. Pat. No. 4,031,307. The resultant quaternary ammonium ethers of polygalactomannan gum generally have a degree of substitution between about 0.01 and 3. Typical examples of such quaternary ammonium ethers are the trialkylammonium halide-alkenyl or alkyl-ethers such as the 4-(trimethylammonium chloride)-2-butenyl ethers of guar and locust bean gum. Other examples of cationic derivatives of polygalactomannan are disclosed in U.S. Pat. No. 3,467,647.

The high molecular weight polymers of ethylene oxide employed in the present process are non-ionic and generally have a molecular weight in excess of 200,000, preferably at least about 5 million. Such polymers are sold commercially by Union Carbide Corporation under the trademark POLYOX.

The fluocculants are added sequentially to the tailings water with the cationic polygalactomannan composition being added first and then the poly(ethylene oxide) added second. The flocculants are conveniently added by means of dilute solutions in water, slowly with vigorous stirring. The solids are then allowed to settle and the clear supernatant liquid separated, such as by decantation.

The amount of cationic polygalactomannan composition added to the water to be treated is in the range of about 0.05 to 0.5 lb. per ton of ore (corresponding to about 0.1 to 1.0 lb. per ton of tailings solids) and the amount of polyethylene oxide is in the range of from about 0.005 to 0.1 lb. per ton of ore (corresponding) to about 0.01 to 0.2 lb. per ton of tailings solids). A preferred ratio of polygalactomannan derivative to poly(ethylene oxide) is about 10:1.

The following examples are presented to illustrate the invention.

EXAMPLES 1-3

An aqueous slurry comprising the tails of a combined rougher and cleaner froth flotation of fluorspar was treated with reagents as described in Table I. The slurry to be treated (1600 ml.) had a specific gravity of about 1.25 and a pH of about 9.5. The slurries were first treated with the polygalactomannan derivative (JAGUAR C-13 0.1% solution) in three stages with about 1.5 minutes between each stage. The poly(ethylene oxide) (POLYOX 0.1% solution) was then added at the end of the third stage. The treated slurry was allowed to settle and the settling rate was recorded. The clarity of the cleared liquor was also determined by a turbidity meter after 5 and 10 minutes, as well as the amount of solids remaining in 50 ml. of the cleared liquor after 10 minutes. The following results were obtained.

TABLE I

| Ex. | 1 | 2 | 3 |
|---|---|---|---|
| JAGUAR (lb/ton ore) | 0.12 | 0.12 | 0.12 |
| POLYOX (lb/ton ore) | 0 | 0.012 | 0.012 |
| Settling rate (ft./hr.) | 93.7 | 120.5 | 105.5 |
| Clarity - 5 min. (NTU) | 63 | 18 | 32.5 |
| Clarity - 10 min. (NTU) | 51 | 12 | 32 |
| Solids (clear liquor) (ppm) | 100 | 16 | 18 |

EXAMPLES 4–8

The procedure of Examples 1–3 was repeated except 100 ml. of slurry was used in the test. The following results were obtained.

TABLE II

| Ex. | 4 | 5 | 6 | 7 | 8 |
|---|---|---|---|---|---|
| JAGUAR (lb/ton ore) | 0.24 | 0.24 | 0.16 | 0.20 | 0.32 |
| POLYOX (lb/ton ore) | 0 | 0.024 | 0.016 | 0.02 | 0.032 |
| Clarity - 10 min. (NTU) | 64 | 29 | 56 | 44 | 23 |
| Solids (clear liquor) (ppm) | 63 | 4 | 15 | 5 | 2 |

Various changes and modifications of the invention can be made, and, to the extent that such variations incorporate the spirit of this invention, they are intended to be included within the scope of the appended claims.

What is claimed is:

1. The method of purifying and clarifying a basic aqueous flotation tailings slurry which comprises sequentially adding first a cationic polygalactomannan flocculant and then a non-ionic poly(ethylene oxide) fluocculant to said slurry, allowing the solids to settle and separating the purified and clarified liquor from said settled solids.

2. The method in accordance with claim 1 in which said poly(ethylene oxide) has a molecular weight in excess of 200,000.

3. The method according to claim 2 in which said poly(ethylene oxide) has a molecular weight of at least about 5 million.

4. The method in accordance with claim 1 in which said cationic polygalactomannan is a quaternary ammonium ether of polygalactomannan.

5. The method in accordance with claim 1 in which said tailings slurry is from a fluorspar froth flotation.

6. The method according to claim 5 in which said cationic polygalactomannan is a quaternary ammonium ether of polygalactomannan.

7. The method according to claim 5 in which the weight ratio of said cationic polygalactomannan to said poly(ethylene oxide) is about 10:1.

8. The method in accordance with claim 1 in which about 0.1 to 1 pound of said cationic polygalactomannan and about 0.01 to 0.2 pound of said poly(ethylene oxide) is added per ton of solids in said tailings slurry.

9. The method in accordance with claim 8 in which the weight ratio of said cationic polygalactomannan to said poly(ethylene oxide) is about 10:1.

10. The method in accordance with claim 9 in which said flotation tailings slurry is a basic aqueous slurry from a fluorspar froth flotation, said cationic polygalactomannan is a quaternary ammonium ether of polygalactomannan and said poly(ethylene oxide) has a molecular weight of at least about 5 million.

* * * * *